US012003697B2

(12) United States Patent
Hong

(10) Patent No.: US 12,003,697 B2
(45) Date of Patent: Jun. 4, 2024

(54) WEARABLE ELECTRONIC DEVICE AND METHOD OF OUTPUTTING THREE-DIMENSIONAL IMAGE

(71) Applicant: Samsung Electronics Co., Ltd., Gyeonggi-do (KR)

(72) Inventor: Sungbin Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 17/747,089

(22) Filed: May 18, 2022

(65) Prior Publication Data
US 2022/0360764 A1     Nov. 10, 2022

Related U.S. Application Data

(63) Continuation of application No. PCT/KR2022/003822, filed on Mar. 18, 2022.

(30) Foreign Application Priority Data

May 6, 2021    (KR) .......................... 10-2021-0058648

(51) Int. Cl.
| | |
|---|---|
| *H04N 13/398* | (2018.01) |
| *H04N 13/128* | (2018.01) |
| *H04N 13/139* | (2018.01) |
| *H04N 13/15* | (2018.01) |

(Continued)

(52) U.S. Cl.
CPC ......... *H04N 13/398* (2018.05); *H04N 13/128* (2018.05); *H04N 13/139* (2018.05);
(Continued)

(58) Field of Classification Search
CPC .. H04N 13/398; H04N 13/128; H04N 13/139; H04N 13/15; H04N 13/156;
(Continued)

(56) References Cited

U.S. PATENT DOCUMENTS

| 9,131,209 B1 | 9/2015 | Demirbag | |
|---|---|---|---|
| 2012/0044459 A1* | 2/2012 | Klein | ................... H04N 13/363 |
| | | | 353/30 |

(Continued)

FOREIGN PATENT DOCUMENTS

| JP | 2011-124935 A | 6/2011 |
|---|---|---|
| KR | 10-2006-0048642 A | 5/2006 |

(Continued)

OTHER PUBLICATIONS

International Search Report dated Jun. 24, 2022.

*Primary Examiner* — Tung T Vo
(74) *Attorney, Agent, or Firm* — Cha & Reiter, LLC

(57) ABSTRACT

A wearable electronic device includes a left-eye display configured to output light of a first color corresponding to a 3D left-eye image, a right-eye display configured to output light of a second color corresponding to a 3D right-eye image, a left-eye optical waveguide configured to adjust a path of the light of the first color and output the light of the first color, a right-eye optical waveguide configured to adjust a path of the light of the second color and output the light of the second color, a left-eye display control circuit configured to supply a driving power and a control signal to the left-eye display, a right-eye display control circuit configured to supply a driving power and a control signal to the right-eye display, a communication module configured to communicate with a mobile electronic device, and a second control circuit configured to supply a driving power and a control signal to the communication module.

20 Claims, 9 Drawing Sheets

(51) Int. Cl.
*H04N 13/156* (2018.01)
*H04N 13/324* (2018.01)
*H04N 13/344* (2018.01)
*H04N 13/00* (2018.01)

(52) U.S. Cl.
CPC ........... *H04N 13/15* (2018.05); *H04N 13/156* (2018.05); *H04N 13/324* (2018.05); *H04N 13/344* (2018.05); *H04N 2013/0077* (2013.01); *H04N 2013/0081* (2013.01); *H04N 2013/0092* (2013.01); *H04N 2013/0096* (2013.01)

(58) Field of Classification Search
CPC ............. H04N 13/324; H04N 13/344; H04N 2013/0077; H04N 2013/0081; H04N 2013/0092; H04N 2013/0096; H04N 13/106; H04N 23/90; H04N 13/334
USPC .......................................................... 348/53
See application file for complete search history.

(56) References Cited

U.S. PATENT DOCUMENTS

| | | | | |
|---|---|---|---|---|
| 2013/0127980 A1* | 5/2013 | Haddick | ................ | G06F 3/013 |
| | | | | 348/14.08 |
| 2013/0242056 A1* | 9/2013 | Fleck | ................ | G02B 27/0172 |
| | | | | 250/206 |
| 2014/0015941 A1 | 1/2014 | Park et al. | | |
| 2014/0168261 A1* | 6/2014 | Margolis | ............... | A63F 13/211 |
| | | | | 345/633 |
| 2015/0185475 A1* | 7/2015 | Saarikko | ............ | G02B 6/02085 |
| | | | | 382/117 |
| 2016/0026253 A1* | 1/2016 | Bradski | ................ | H04N 13/128 |
| | | | | 345/8 |
| 2016/0286210 A1* | 9/2016 | Border | ..................... | G02B 7/08 |
| 2019/0188474 A1 | 6/2019 | Zahnert et al. | | |
| 2022/0103752 A1* | 3/2022 | Ding | ..................... | H04N 23/80 |

FOREIGN PATENT DOCUMENTS

| | | |
|---|---|---|
| KR | 10-0915793 B1 | 8/2009 |
| KR | 10-2012-0015719 A | 2/2012 |
| KR | 10-2012-0054569 A | 5/2012 |
| KR | 10-2012-0059947 A | 6/2012 |
| KR | 10-2012-0072892 A | 7/2012 |
| KR | 10-1306439 B1 | 9/2013 |
| KR | 10-2014-0066258 A | 5/2014 |
| KR | 10-1651294 B1 | 8/2016 |
| KR | 10-1731113 B1 | 4/2017 |
| KR | 10-2019-0032473 A | 3/2019 |
| KR | 10-2019-0117415 A | 10/2019 |

* cited by examiner

WEARABLE ELECTRONIC DEVICE AND METHOD OF OUTPUTTING THREE-DIMENSIONAL IMAGE

CROSS-REFERENCE TO RELATED APPLICATIONS

This application is a continuation of International Application No. PCT/KR2022/003822, filed on Mar. 18, 2022, which claims priority to Korean Patent Application No. 10-2021-0058648, filed on May 6, 2021, in the Korean Intellectual Property Office, the disclosures of which are incorporated by reference herein in their entireties.

BACKGROUND

1. Technical Field

One or more embodiments of the instant disclosure generally relate to a wearable electronic device including a display.

2. Description of Related Art

Recently, with the growth of electronic devices such as smartphones and tablet personal computers (PCs), electronic devices enabling wireless voice calls and information exchange have become increasingly commonplace. Electronic devices were initially relatively simple portable devices that were used for wireless calls. However, with the development of technology and the introduction of the wireless Internet, electronic devices are no longer simply portable devices for wireless calls but are developed into multimedia devices for performing functions such as scheduling, gaming, remote control, or image capturing, satisfying user demands.

In particular, in recent years, electronic devices providing augmented reality (AR) service have been introduced on the market. AR service is a service where virtual images having supplementary information are superimposed on real-world images seen by a user, and may provide the user with virtual object images including content related to a real object identified from the real-world image.

SUMMARY

A three-dimensional (3D) image generation implementation using glasses may provide 3D images to the user through a 3D-exclusive display device and 3D-exclusive glasses such as liquid crystal shutter glasses. However, the 3D image generation implementation with glasses requires images generated in 3D, a 3D-exclusive display device for displaying a 3D image, and 3D-exclusive glasses corresponding to the 3D-exclusive display device.

A 3D image generation implementation that does not use glasses may track the gaze of the user and generate 3D images suitable for the user's viewing gaze to provide the 3D image. However, this 3D image generation implementation, which does not use glasses, still requires a 3D-exclusive display device for generating the 3D images, such as lenticular lenses or parallax barriers, for example.

According to an example embodiment, the wearable electronic device may include a left-eye display configured to output light of a first color corresponding to a 3D left-eye image, a right-eye display configured to output light of a second color corresponding to a 3D right-eye image, a left-eye optical waveguide configured to adjust a path of the light of the first color and output the light of the first color, a right-eye optical waveguide configured to adjust a path of the light of the second color and output the light of the second color, a left-eye display control circuit configured to supply a driving power and a control signal to the left-eye display, a right-eye display control circuit configured to supply a driving power and a control signal to the right-eye display, a communication module configured to communicate with a mobile electronic device, and a second control circuit configured to supply a driving power and a control signal to the communication module. The mobile electronic device may be configured to extract depth information from a two-dimensional (2D) left-eye image and a 2D right-eye image, generate a converted left-eye image and a converted right-eye image by converting the 2D left-eye image and the 2D right-eye image based on the depth information, generate an aligned left-eye image and an aligned right-eye image by performing vertical alignment on the converted left-eye image and the converted right-eye image, generate a 3D left-eye image and a 3D right-eye image by performing color anaglyph with the first color on the aligned left-eye image and performing color anaglyph with the second color on the aligned right-eye image, and display the 3D left-eye image and the 3D right-eye image using a display of the mobile electronic device. The communication module may be configured to receive information about the first color and information about the second color from the mobile electronic device.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
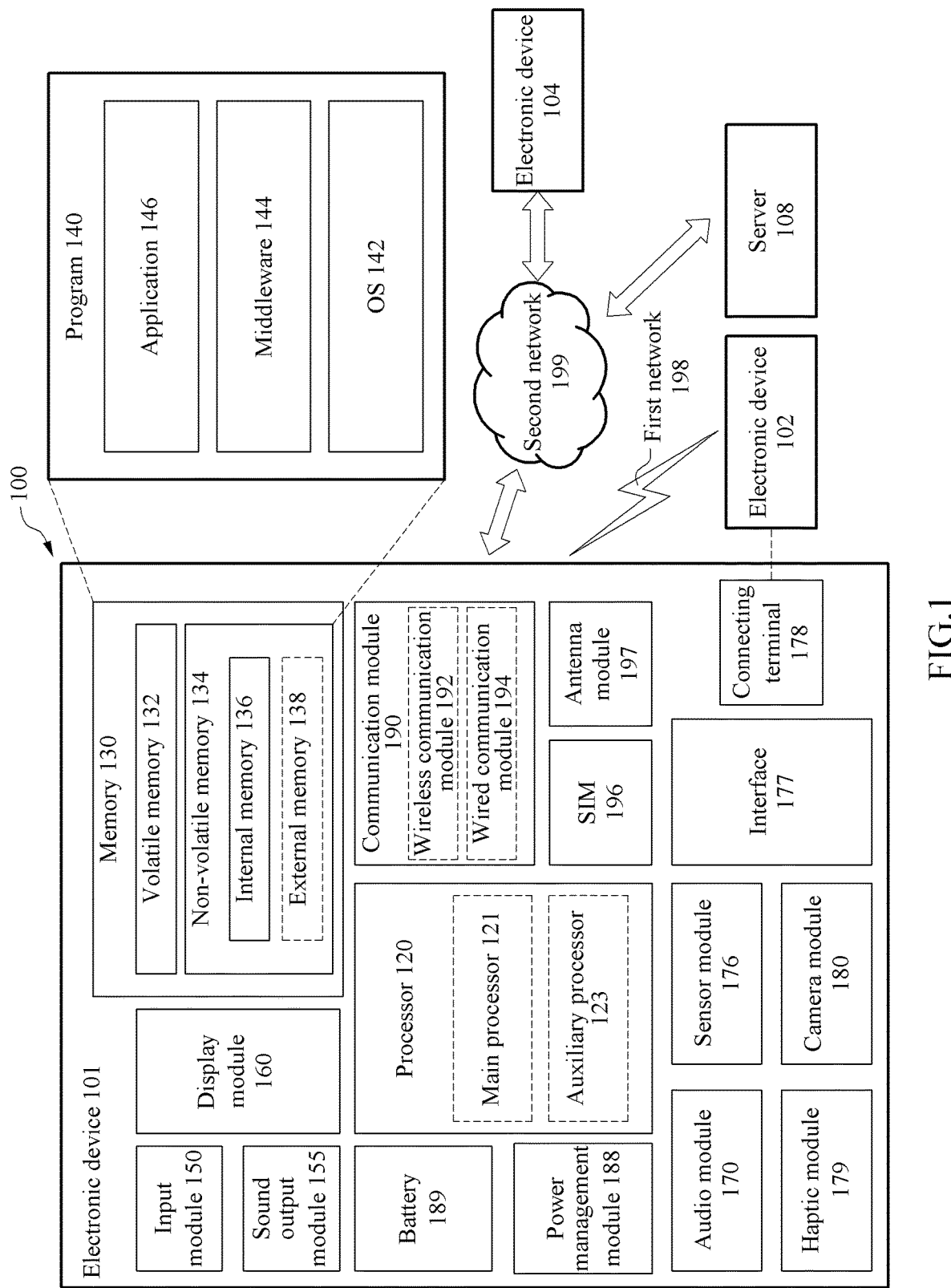
FIG. 1 is a block diagram of an electronic device in a network environment according to an example embodiment.

Hereinafter, example embodiments will be described in detail with reference to the accompanying drawings. When describing the example embodiments with reference to the accompanying drawings, like reference numerals refer to like constituent elements and a repeated description related thereto will be omitted.

According to an example embodiment, a wearable electronic device or a mobile electronic device interoperating with the wearable electronic device may generate a 3D image from 2D images even though the 3D image is not provided. The wearable electronic device may provide 3D effect by applying different colors to each of a left image and a right image, without requiring an expensive 3D-exclusive display device.

FIG. 1 is a block diagram of an electronic device in a network environment according to an example embodiment.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
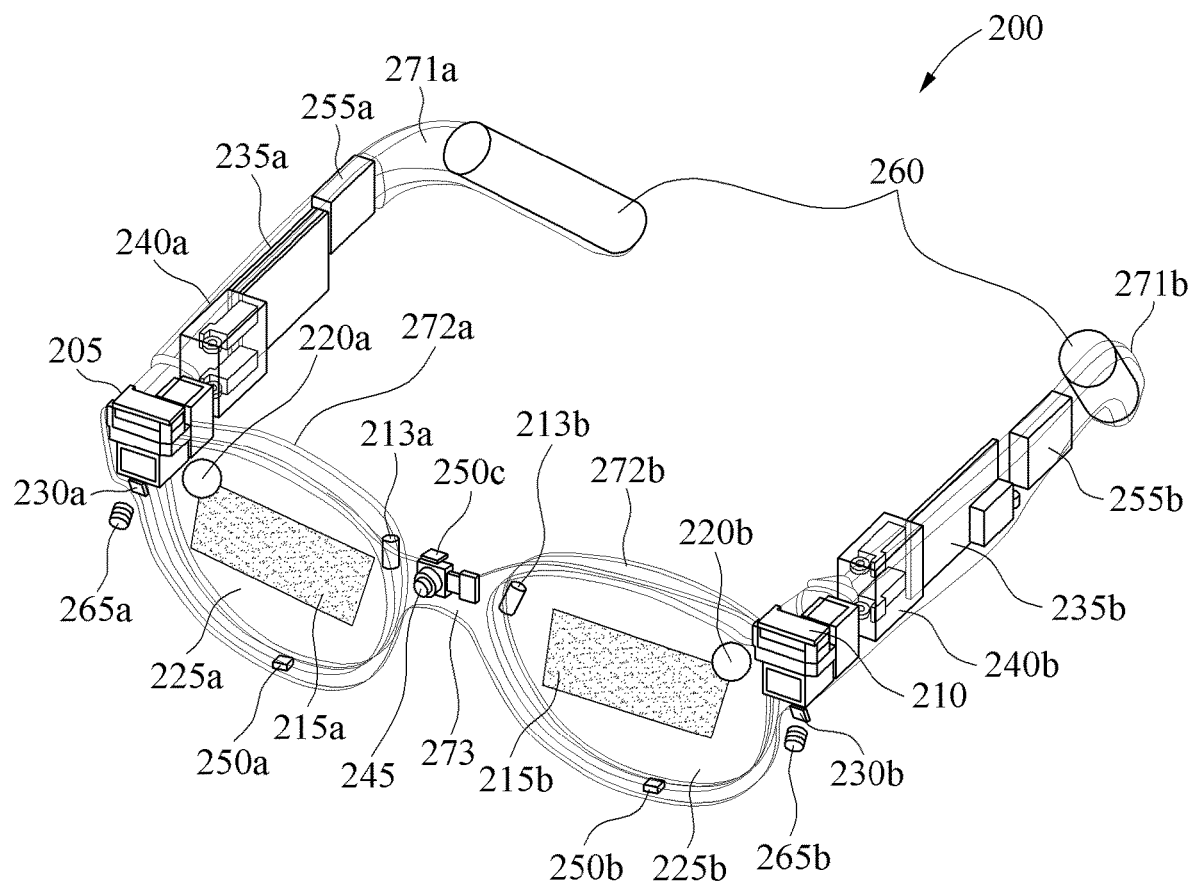
FIG. 2 is a diagram illustrating a structure of a wearable electronic device according to an example embodiment.

FIG. 2 is a diagram illustrating a structure of a wearable electronic device according to an example embodiment.

Referring to FIG. 2, a wearable electronic device 200 (e.g., the electronic device 101 of FIG. 1) may be worn on the face of a user to provide the user with images associated with augmented reality (AR) and/or virtual reality (VR).

In an example embodiment, the wearable electronic device 200 may include a first display 205, a second display 210, optical waveguides 215a and 215b, input optical members 220a and 220b, a first transparent member 225a, a second transparent member 225b, lighting units 230a and 230b, a first PCB 235a, a second PCB 235b, a first hinge 240a, a second hinge 240b, a first camera 245, a plurality of microphones (e.g., first microphone 250a, second microphone 250b, and third microphone 250c), a plurality of speakers (e.g., first speaker 255a and second speaker 255b), a battery 260, a second camera 265a, and a third camera 265b.

In an example embodiment, the display (e.g., the first display 205, the second display 210, and the display module 160 of FIG. 1) may use various display technologies, such as liquid crystal display (LCD), digital mirror device (DMD), liquid crystal on silicon (LCoS), organic light-emitting diode (OLED), micro light-emitting diode (micro-LED), or the like. Although not shown, when the display is implemented using LCD, DMD, or LCoS, the wearable electronic device 200 may include a light source configured to emit light to a screen output area of the display. In an example embodiment, when the display is capable of generating light by itself, for example, when the display is implemented by either OLED or micro-LED, the wearable electronic device 200 may provide relatively high quality images to the user even though separate light sources are not included. For example, when the display is implemented as OLED or micro-LED, a light source may be unnecessary, which may minimize the weight of the wearable electronic device 200. Hereinafter, a display capable of generating light by itself may be referred to as a "self-luminous display." A display that need to be assisted by an auxiliary light source or backlight may be referred to as a "non-self-luminous display."

A display (e.g., the first display 205 and the second display 210) according to an example embodiment may be implemented by micro-LED technology. For example, micro-LEDs in the display may individually output red (R), green (G), and blue (B) light, and a single chip may implement a single pixel (e.g., one of R, G, and B pixels) because the micro-LED is relatively small in size (e.g., 100 μm or less). Accordingly, it may be possible to provide high resolution without a backlight unit (BLU), when the display is implemented using micro-LED.

However, the example embodiments are not limited thereto, and a single chip may implement a plurality of pixels including R, G, and B pixels.

In an example embodiment, the display (e.g., the first display 205 and the second display 210) may include pixels for displaying virtual images. The display may further include infrared pixels that emit infrared light.

In an example embodiment, the display may further include light-receiving pixels (e.g., photo sensor pixels) that are disposed between pixels and configured to receive light reflected from the eyes of the user, convert the received light to electrical energy, and output the electrical energy. Light-receiving pixels may be collectively referred to as a "gaze tracking sensor." The gaze tracking sensor may detect infrared light generated by infrared pixels included in the display and reflected by the eyes of the user.

In an example embodiment, the wearable electronic device 200 may include separate gaze tracking cameras 213a and 213b (e.g., IR LED detection sensors). The gaze tracking cameras 213a and 213b may detect infrared light reflected by the eyes of the user. The wearable electronic device 200 may track the gaze of the user based on the infrared light detected by the gaze tracking cameras 213a and 213b. The wearable electronic device 200 may determine the central position of a virtual image based on the gaze directions (e.g., gaze directions of the right eye and the left eye of the user).

In an example embodiment, the wearable electronic device 200 may detect the gaze direction (e.g., movement of a pupil) of the user, using the light receiving pixels. For example, the wearable electronic device 200 may detect and track the gaze direction of the right eye of the user and the gaze direction of the left eye of the user using one or more light-receiving pixels of the first display 205 and one or more light-receiving pixels of the second display 210. The wearable electronic device 200 may determine the central position of a virtual image according to the gaze directions (e.g., gaze directions of the pupils of the right eye and the left eye of the user).

The first display 205 and the second display 210 may each include a first control circuit (not shown). The first control circuit may control the first display 205 and the second display 210. The first control circuit may control operations of a liquid crystal element of a transparent cover (not shown) included in each of the first display 205 and the second display 210, when the first display 205 and the second display 210 are implemented as LCDs, for example.

In an example embodiment, light emitted from the display (e.g., the first display 205 and the second display 210) may reach the optical waveguide 215a formed on the first transparent member 225a that faces the right eye of the user, and the optical waveguide 215b formed on the second transparent member 225b that faces the left eye of the user, by passing through a lens (not shown) and a waveguide. For example, the light emitted from the display (e.g., the first display 205 and the second display 210) may be reflected from a grating area of a waveguide formed in each of the optical waveguides 215a and 215b and the input optical members 220a and 220b, and may be transmitted to the eyes of the user. The first transparent member 225a and/or the second transparent member 225b may be implemented as, for example, glass plate, plastic plate, or be made of polymer, and may be transparent or translucent. The first transparent member 225a and the second transparent member 225b may each include a transparent substrate on which a transparent electrode made of, for example, indium tin oxide (ITO), is disposed.

In an example embodiment, a lens (not shown) may be disposed on a front surface of the display (e.g., the first display 205 and the second display 210). The lens (not shown) may be a concave lens and/or a convex lens. For example, the lens (not shown) may be used as a projection lens or a collimation lens.

In an example embodiment, the optical waveguides 215a and 215b or a transparent member (e.g., the first transparent member 225a and the second transparent member 225b) may include a reflective lens, and a lens including a waveguide. The waveguide may be referred to as an "optical waveguide." The waveguide may create a path through which external light is incident, totally reflected, and emitted, and may be distinguished from the first transparent member 225a and the second transparent member 225b through which external light is simply reflected or transmitted.

In an example embodiment, the waveguide may be made of glass, plastic, or polymer, and may have a nanopattern formed on one surface of the inside or outside, for example, to implement a polygonal or curved grating structure. According to an example embodiment, light incident to one end of the waveguide through the input optical members 220a and 220b may be propagated inside a display waveguide by the nanopattern to be provided to the user. For example, a waveguide including a freeform prism may provide incident light to the user through a reflection mirror. The waveguide may include a reflective element (e.g., reflection mirror) and/or at least one diffractive element (e.g., diffractive optical element (DOE) or holographic optical element (HOE)). In an example embodiment, the waveguide may guide light emitted from the first display 205 and the second display 210 to the eyes of the user, using the at least one diffractive element or the reflective element included in the waveguide.

According to certain example embodiments, the diffractive element may include the input optical members 220a and 220b and/or an output optical member (not shown). For example, the input optical members 220a and 220b may correspond to input grating areas, and the output optical member (not shown) may correspond to an output grating area. The input grating area may function as an input terminal to diffract (or reflect) light output from the display (e.g., the first display 205 and the second display 210 (e.g., a micro-LED)) to transmit the light to the optical waveguides 215a and 215b. The output grating area may function as an exit to diffract (or reflect) light transmitted to the waveguide to the eyes of the user.

The waveguide may function as a path through which light passes. The waveguide may include the input optical members 220a and 220b and an output optical member (not shown). The area of the waveguide in which light is totally reflected may be combined with or separated from the input optical members 220a and 220b and the output optical member (not shown).

According to certain example embodiments, the reflective element may include a total reflection optical element or a total reflection waveguide for total internal reflection (TIR). In total reflection, an angle of incidence is formed such that light (e.g., light of a virtual image) entering through an input grating area is completely or almost completely reflected from one surface of the waveguide, to completely or almost completely transmit the light to an output grating area.

In an example embodiment, the light emitted from the first display 205 and the second display 210 may be guided by the waveguide through the input optical members 220a and 220b. Light traveling in the waveguide may be guided toward the eyes of the user through the output optical member. A screen output area may be determined based on light emitted toward the eyes of the user.

In an example embodiment, the first camera 245 may be referred to as "high resolution (HR)" or "photo video (PV)", and may include a high-resolution camera. The first camera 245 may include a color camera for obtaining high-quality images, and may implement functions such as automatic focus (AF) and optical image stabilization (OIS). The example embodiments are not limited thereto, and the first camera 245 may include a global shutter (GS) camera or a rolling shutter (RS) camera.

In an example embodiment, the second camera 265a and the third camera 265b may include cameras used for three degrees of freedom (3DoF) and six degrees of freedom (6DoF) head tracking, hand detection and tracking, and gesture and/or space recognition. For example, the second camera 265a and the third camera 265b may each include a GS camera to detect movements of the head or hands of the user and track the movements.

In an example embodiment, at least one sensor (not shown, e.g., gyro sensor, acceleration sensor, geomagnetic sensor, and/or gesture sensor), the second camera 265a, and the third camera 265b may perform functions such as head tracking for 6DoF, pose estimation and prediction, gesture and/or space recognition, and/or simultaneous localization and mapping (SLAM) through depth imaging.

In an example embodiment, the second camera 265a and the third camera 265b may be used as cameras for head tracking and cameras for hand tracking.

In an example embodiment, the lighting units 230a and 230b may be omitted. The lighting units 230a and 230b may be replaced by infrared pixels included in the first display 205 and the second display 210. In an example embodiment, the lighting units 230a and 230b may be included in the wearable electronic device 200 to assist infrared pixels included in the first display 205 and the second display 210. The lighting units 230a and 230b may be used differently according to positions in which the light units 230a and 230b are attached. For example, the lighting units 230a and 230b may be disposed together with the second camera 265a and the third camera 265b mounted around a hinge (e.g., the first hinge 240a and the second hinge 240b) that connects frames 272a and 272b and temples 271a and 271b or around a bridge 273 that connects frames. If capturing is performed using a GS camera, the lighting units 230a and 230b may be used to increase the ambient brightness. For example, the lighting units 230a and 230b may be used in a dark environment or when it is not easy to detect a subject to be captured due to the mixing of various light sources.

In an example embodiment, a second control circuit (not shown, e.g., the processor 120 of FIG. 1) to control components of the wearable electronic device 200 other than the first display 205 and the second display 210 may be located in a PCB (e.g., the first PCB 235a and the second PCB 235b). The second control circuit may control components other than the first display 205 and the second display 210 and perform operation such as depth value estimation. The second control circuit may include a communication circuit (e.g., the communication module 190 of FIG. 1) or a memory (e.g., the memory 130 of FIG. 1). In an example embodiment, the first control circuit and the second control circuit may be integrated as a single circuit. For example, an integrated control circuit may control the first display 205, the second display, and/or the other components.

In an example embodiment, a plurality of microphones (e.g., the first microphone 250a, the second microphone 250b, and the third microphone 250c, and the input module 150 of FIG. 1) may convert external acoustic signals into electrical audio data. The electrical audio data may be variously utilized according to various functions (or applications being executed) being performed by the wearable electronic device 200.

In an example embodiment, a plurality of speakers (e.g., the first speaker 255a, the second speaker 255b, and the sound output module 155 of FIG. 1) may output audio data received from a communication circuit (e.g., the communication module 190 of FIG. 1) or stored in a memory (e.g., the memory 130 of FIG. 1).

In an example embodiment, one or more batteries 260 (e.g., the battery 189 of FIG. 1) may be included and may supply power to components of the wearable electronic device 200.

Figure 3:
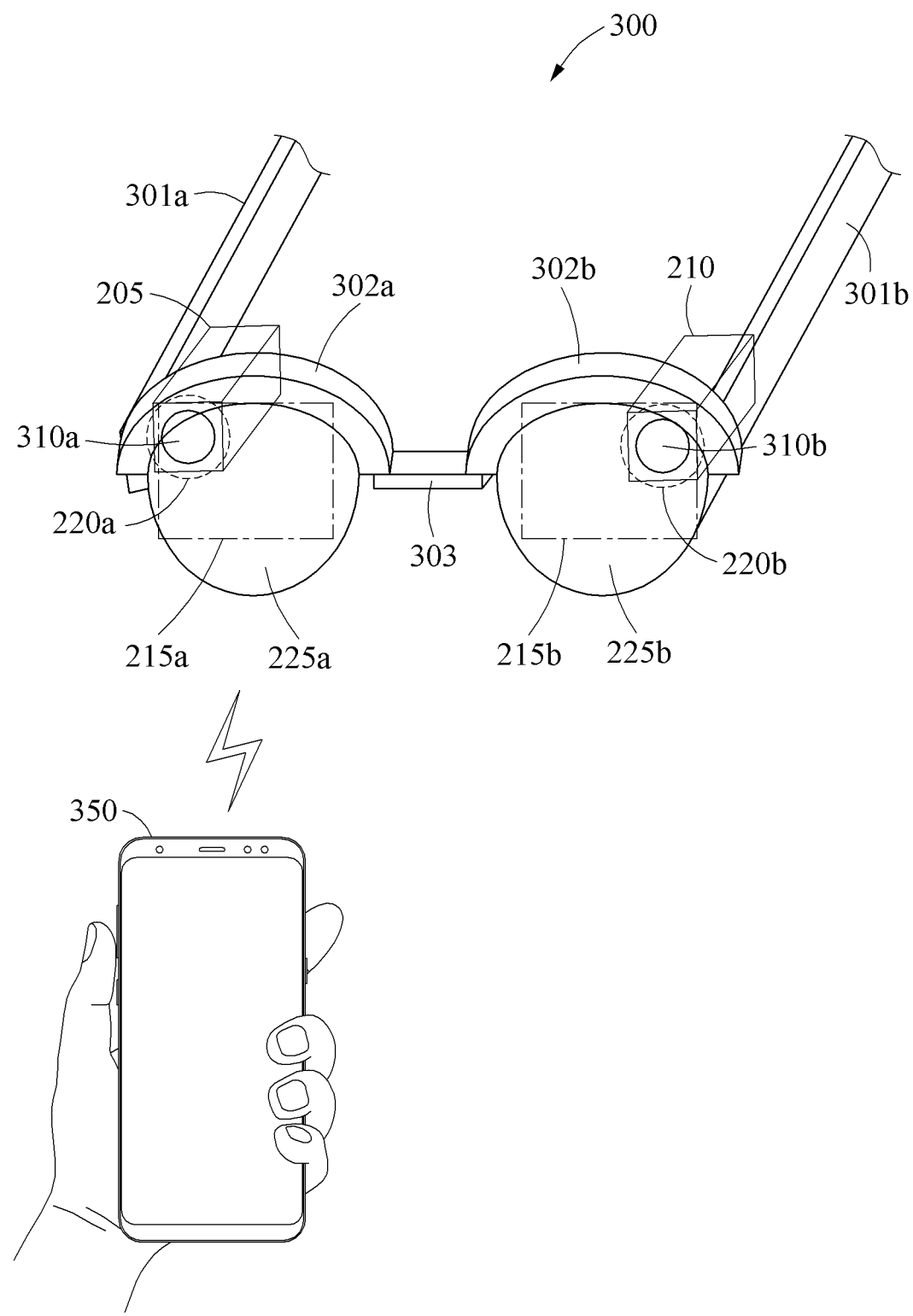
FIG. 3 is a diagram illustrating a situation in which a three-dimensional (3D) image is generated by a wearable electronic device according to an example embodiment.

FIG. 3 is a diagram illustrating a situation in which a three-dimensional (3D) image is generated by a wearable electronic device according to an example embodiment.

According to an example embodiment, a wearable electronic device 300 (e.g., the wearable electronic device 200 of FIG. 2) may include a frame member (or housing) including temples 301a and 301b, eyeglass frames 302a and 302b, and a bridge 303. A wearable electronic device 300 may include a right-eye display 205 (e.g., the first display 205 of FIG. 2), a left-eye display 210 (e.g., the second display 210 of FIG. 2), optical elements 310a and 310b, a right-eye optical waveguide 215a (e.g., the optical waveguide 215a of FIG. 2), a left-eye optical waveguide 215b (e.g., the optical waveguide 215b of FIG. 2), a left-eye display control circuit (not shown, e.g., control circuit included in the second display 210 of FIG. 2), a right-eye display control circuit (not shown, e.g., control circuit included in the first display 205 of FIG. 2), and a second control circuit (not shown) that may be located on, for example, the first PCB 235a and the second PCB 235b of FIG. 2. However, the left-eye display control circuit, the right-eye display control circuit, and the second control circuit are separate only in this example, and one control circuit may also control displays and other components, and three or more control circuits may control components of the wearable electronic device 300. A transparent member 225a may include an input optical member 220a and the right-eye optical waveguide 215a. The input optical member 220a and the right-eye optical waveguide 215a may be separated or connected. A transparent member 225b may include an input optical member 220b and the left-eye optical waveguide 215b. The input optical member 220b and the left-eye optical waveguide 215b may be separated or connected.

The wearable electronic device 300 may transmit visible light corresponding to a virtual image from the right-eye display 205 and the left-eye display 210 to the eyes of the user through the right-eye optical waveguide 215a and the left-eye optical waveguide 215b. The wearable electronic device 300 may transmit light output from the right-eye display 205 and the left-eye display 210 toward the eyes of the user through the right-eye optical waveguide 215a and the left-eye optical waveguide 215b, and may provide a see-through function of allowing the outside of the wearable electronic device 300 to be viewed using the transparent members 225a and 225b or the right-eye optical waveguide 215a and the left-eye optical waveguide 215b. Thus in this case, the wearable electronic device 300 may be AR glasses.

According to an example embodiment, the wearable electronic device 300 may provide 3D images generated from 2D images to the user wearing the wearable electronic device 300. The wearable electronic device 300 may provide the user with 3D images corresponding to the left eye and the right eye of the user by applying different colors to different 2D images corresponding to the left eye and the right eye.

Hereinafter, the 2D image corresponding to the left eye may be referred to as a "2D left-eye image.". The 2D image corresponding to the right eye may be referred to as a "2D right-eye image." The color applied to the 2D left-eye image or the 2D left-eye image on which image processing is performed may be referred to as "first color." The color applied to the 2D right-eye image or the 2D right-eye image on which image processing is performed may be referred to as "second color." Here, the image processing may include processing images based on depth information such that the depth information is embodied in the image, or processing images such that the left image and the right image are aligned, but is not limited thereto. For example, the image processing may include all processing operations to generate 3D images from 2D images. The 3D image to which the first color is applied and that corresponds to the left eye may be referred to as "3D left-eye image." The 3D image to which the second color is applied and that corresponds to the right eye may be referred to as "3D right-eye image."

The wearable electronic device 300 may perform image processing for 3D conversion, which may be referred to as a "standalone scheme." Image processing for 3D conversion may be performed in an electronic device other than the wearable electronic device 300 and the processing result may be received by the wearable electronic device 300 using a wire such as a universal serial bus (USB) wire, which may be referred to as a "tethered manner." Image processing for 3D conversion may be performed in an electronic device other than the wearable electronic device 300 and the processing result may be received by the wearable electronic device 300 using a wireless communication, which may be referred to as "wireless scheme" or "tethered scheme." Hereinafter, an example in which image processing for 3D conversion is performed in an electronic device other than the wearable electronic device 300, and an example of the standalone scheme will be described sequentially.

According to an example embodiment, image processing for 3D conversion may be performed in an electronic device other than the wearable electronic device 300. For example, a mobile electronic device 350 (e.g., the electronic device 102 of FIG. 1) may perform image processing for 3D conversion. The wearable electronic device 300 may interoperate with the mobile electronic device 350 that displays 2D images. The wearable electronic device 300 may interoperate with the mobile electronic device 350 via a wire or wirelessly. The mobile electronic device 350 may display or generate 3D images generated from 2D images corresponding to the left eye and the right eye. The wearable electronic device 300 may receive information about colors corresponding to each of the left eye and the right eye from the mobile electronic device 350. The wearable electronic device 300 may provide the 3D effect to the user by applying a different color to each of received 3D images corresponding to the left eye and the right eye and providing the 3D images to the user.

According to an example embodiment, a display mode of the wearable electronic device 300 may include a 3D mode for displaying 3D images. According to an example embodiment, the display modes of the wearable electronic device 300 may also include a 2D mode for displaying 2D images, as well as the 3D mode. If the wearable electronic device 300 operates in the 3D mode or the display mode is switched from the 2D mode to the 3D mode, the wearable electronic device 300 may send a request for conversion of 3D images to the mobile electronic device 350 that interoperates with the wearable electronic device 300. The mobile electronic device 350 may determine whether currently provided content is a 2D image or a 3D image. If the currently provided content is determined as a 3D image, the mobile electronic device 350 may transmit information of colors corresponding to each of the left eye and the right eye to the wearable electronic device 300. If the currently provided content is determined as a 2D image, the mobile electronic device 350 may perform image processing to convert the 2D image into a 3D image.

According to an example embodiment, the mobile electronic device 350 may perform image processing on a 2D left-eye image and a 2D right-eye image. The mobile electronic device 350 may output a 3D left-eye image and a 3D right-eye image from the 2D left-eye image and the 2D right-eye image through image processing. The mobile electronic device 350 may process a 2D image based on depth information such that the depth information may be embodied in the image, or process a 2D image such that a left image and a right image may be aligned. However, this is merely an example, and the mobile electronic device 350 may perform all processing operations to generate a 3D image from a 2D image.

The mobile electronic device 350 may extract depth information from the 2D left-eye image and the 2D right-eye image. The mobile electronic device 350 may convert the 2D left-eye image and the 2D right-eye image by reflecting the depth information extracted from the 2D left-eye image and the 2D right-eye image.

The mobile electronic device 350 may align a converted left-eye image and a converted right-eye image. Image alignment may be an operation in which a projection scheme and a sum of absolute differences (SAD) scheme are mixed, but is not limited thereto, and various image alignment schemes may be used. Image alignment may include vertical alignment or horizontal alignment. Since an average person is visually less sensitive to horizontal alignment of the left-eye image and the right-eye image, image alignment may include only vertical alignment.

The mobile electronic device 350 may project the converted left-eye image onto the converted right-eye image or project the converted right-eye image onto the converted left-eye image to superimpose the converted left-eye image and the converted right-eye image to generate a composite image. The mobile electronic device 350 may divide the composite image into one or more window areas. The mobile electronic device 350 may calculate an SAD for the divided left-eye image and the divided right-eye image for each window area. The mobile electronic device 350 may calculate the sum of absolute values of differences in pixel values between the divided left-eye image and the divided right-eye image. For example, the mobile electronic device 350 may divide a projected image into 16 windows and calculate an SAD for each window.

According to an example embodiment, the mobile electronic device 350 may vertically or horizontally align the converted left-eye image and the converted right-eye image so that a sum of the SADs for all windows may be minimized.

According to an example embodiment, the mobile electronic device 350 may calculate a sum of SADs by using different weights for each window. The mobile electronic device 350 may vertically or horizontally align the converted left-eye image and the converted right-eye image so that the sum of the SADs, after applying the weights, may be minimized. For example, the mobile electronic device

350 may set a weight of a window located in the central portion of an image to be greater than a weight of a window located in the outer edge of the image.

According to an example embodiment, the mobile electronic device 350 may generate a 3D left-eye image and a 3D right-eye image by performing color anaglyph with the first color on an aligned left-eye image and performing color anaglyph with the second color on an aligned right-eye image. For example, the first color may be red, and the second color may be cyan, but the example embodiments are not limited thereto. The first color and the second color may be all color pairs that may provide 3D effect.

The wearable electronic device 300 may receive information about the first color and information about the second color from the mobile electronic device 350 using a communication module (e.g., the communication module 190 of FIG. 1). The communication module may support establishment of a wired communication channel or a wireless communication channel between the wearable electronic device 300 and the mobile electronic device 350, as well as support communication through the established communication channel. The communication module may include one or more communication processors configured to support wired communication or wireless communication. According to an example embodiment, the communication module may include a wireless communication module (e.g., cellular communication module, short-range wireless communication module, or GNSS communication module) or a wired communication module (e.g., LAN communication module, or PLC module).

One of these communication modules may communicate with the mobile electronic device 350 via a first network (e.g., short-range communication network, such as Bluetooth™, Wi-Fi direct, or IrDA) or a second network (e.g., long-range communication network, such as legacy cellular network, 5G network, next-generation communication network, the Internet, or a computer network (e.g., LAN or WAN)). These various types of communication modules may be implemented as a single component (e.g., a single chip), or may be implemented as multi components (e.g., multi chips) separate from each other. The wireless communication module may identify and authenticate the wearable electronic device 300 in a communication network, such as the first network or the second network, using subscriber information (e.g., IMSI) stored in a SIM.

The wearable electronic device 300 may display a 3D left-eye image and a 3D right-eye image, to which different colors are applied, to the user, using the left-eye display 210 and the right-eye display 205. The left-eye display 210 may output light of the first color corresponding to the 3D left-eye image. The right-eye display 205 may output light of the second color corresponding to the 3D right-eye image.

The light of the first color output from the left-eye display 210 may be output to the user through the left-eye optical waveguide 215b. The left-eye optical waveguide 215b may output the light of the first color through an output optical member by adjusting the path of the light of the first color. The light of the second color output from the right-eye display 205 may be output to the user through the right-eye optical waveguide 215a. The right-eye optical waveguide 215a may output the light of the second color through an output optical member by adjusting the path of the light of the second color.

The left-eye display 210 and the right-eye display 205 may include a non-self-luminous display supported by an auxiliary light source, or a self-luminous display capable of generating light by itself.

According to an example embodiment, the wearable electronic device 300 may use a non-self-luminous display. The non-self-luminous display may include a light modulator and an auxiliary light source. For example, the light modulator may be implemented using LCD, DMD, or LCoS technologies.

According to an example embodiment, the wearable electronic device 300 may use a self-luminous display. The self-luminous display may include a plurality of visible light pixels that output visible light corresponding to a virtual image. The visible light pixels may include R, G, and B pixels. The self-luminous display may include, for example, OLEDs or micro-LEDs, but is not limited thereto. A self-luminous display may not require a separate light source or an illumination optical system.

According to an example embodiment, the wearable electronic device 300 may provide 3D effect to the user, using the standalone scheme. The wearable electronic device 300 may interoperate with the mobile electronic device 350 and/or a server (e.g., the server 108 of FIG. 1) via a wire or wirelessly. The wearable electronic device 300 may perform image processing on 2D images to convert the 2D images into 3D images and display the 3D image using the mobile electronic device 350. The mobile electronic device 350 may display the first color and the second color corresponding to the left eye and the right eye, respectively. The wearable electronic device 300 may provide the 3D effect to the user by applying different colors to each of received 3D images corresponding to the left eye and the right eye and providing the 3D images to the user.

The wearable electronic device 300 may determine whether currently provided content is a 2D image or a 3D image. When the currently provided content is determined as a 3D image, the wearable electronic device 300 may transmit the 3D image to the mobile electronic device 350. When the currently provided content is determined as a 2D image, the wearable electronic device 300 may perform image processing to convert the 2D image into a 3D image.

According to an example embodiment, the wearable electronic device 300 may perform image processing on a 2D left-eye image and a 2D right-eye image. The wearable electronic device 300 may output a 3D left-eye image and a 3D right-eye image from the 2D left-eye image and the 2D right-eye image after image processing. The wearable electronic device 300 may process the 2D image to reflect depth information using the depth information or process the 2D image to align the left image and the right image. However, this is merely an example, and the wearable electronic device 300 may perform all processing operations for generating a 3D image from a 2D image.

The wearable electronic device 300 may extract depth information from the 2D left-eye image and the 2D right-eye image. The wearable electronic device 300 may convert the 2D left-eye image and the 2D right-eye image by reflecting the extracted depth information to the 2D left-eye image and the 2D right-eye image.

The wearable electronic device 300 may perform image alignment on the converted left-eye image and the converted right-eye image. Image alignment may use, but is not limited to, for example, a projection scheme and an SAD scheme, and various image alignment schemes may be used. The image alignment may include vertical alignment or horizontal alignment. Since the average person is visually less sensitive to horizontal alignment of the left-eye image and the right-eye image, image alignment may include only vertical alignment.

The wearable electronic device 300 may project the converted left-eye image onto the converted right-eye image or project the converted right-eye image onto the converted left-eye image to superimpose the converted left-eye image and the converted right-eye image to generate a composite image. The wearable electronic device 300 may divide the composite image into one or more window areas. The wearable electronic device 300 may calculate an SAD for the divided left-eye image and the divided right-eye image for each window area. The wearable electronic device 300 may calculate the sum of absolute values of differences in pixel values between the divided left-eye image and the divided right-eye image. For example, the wearable electronic device 300 may divide a projected image into 16 windows and calculate an SAD for each window.

According to an example embodiment, the wearable electronic device 300 may vertically or horizontally align the converted left-eye image and the converted right-eye image such that the sum of SADs for all windows may be minimized.

According to an example embodiment, the wearable electronic device 300 may calculate the sum of SADs by reflecting different weights for each window. The wearable electronic device 300 may vertically or horizontally align the converted left-eye image and the converted right-eye image such that the sum of the SADs reflecting the weights may be minimized. For example, the wearable electronic device 300 may set the weight of a window located in the central portion of an image to be greater than the weight of a window located in the outer edge of the image.

According to an example embodiment, the wearable electronic device 300 may generate a 3D left-eye image and a 3D right-eye image by performing a color anaglyph with a first color on the aligned left-eye image and performing a color anaglyph with a second color on the aligned right-eye image. For example, the first color may be red, and the second color may be cyan, but the example embodiments are not limited thereto. The first color and the second color may be all color pairs that may provide a 3D effect.

The wearable electronic device 300 may transmit the 3D left-eye image and the 3D right-eye image to the mobile electronic device 350 using a communication module (e.g., the communication module 190 of FIG. 1). The communication module may support establishment of a wired communication channel or a wireless communication channel between the wearable electronic device 300 and the mobile electronic device 350, and support communication through the established communication channel. The communication module may include one or more communication processors configured to support a wired communication or a wireless communication.

The mobile electronic device 350 may display the 3D left-eye image and the 3D right-eye image received from the wearable electronic device 300. The wearable electronic device 300 may output light of the first color and light of the second color, using the left-eye display 210 and the right-eye display 205. The left-eye display 210 may output light of a first color corresponding to the 3D left-eye image. The right-eye display 205 may output light of a second color corresponding to the 3D right-eye image.

The light of the first color output from the left-eye display 210 may be output to the user through the left-eye optical waveguide 215b. The left-eye optical waveguide 215b may output the light of the first color through an output optical member by adjusting the path of the light of the first color. The light of the second color output from the right-eye display 205 may be output to the user through the right-eye optical waveguide 215a. The right-eye optical waveguide 215a may output the light of the second color through an output optical member by adjusting the path of the light of the second color.

The display may include a non-self-luminous display supported by an auxiliary light source, or a self-luminous display capable of generating light by itself.

According to an example embodiment, the wearable electronic device 300 may use a non-self-luminous display. The non-self-luminous display may include a light modulator and an auxiliary light source. For example, the light modulator may be an LCD, a DMD, or an LCoS display.

According to an example embodiment, the wearable electronic device 300 may use a self-luminous display. The self-luminous display may include a plurality of visible light pixels that output visible light corresponding to a virtual image. The visible light pixels may include R, G, and B pixels.

According to an example embodiment, the wearable electronic device 300 may generate a 3D image from a 2D image even though the 3D image is not provided. The wearable electronic device 300 may provide 3D effect by applying different colors to each of the left image and the right image, without requiring an expensive 3D-exclusive display device. The wearable electronic device 300 may provide the 3D effect by applying different colors to each of the left image and the right image, without requiring an additional components such as lenticular lenses or parallax barriers.

Figure 4:
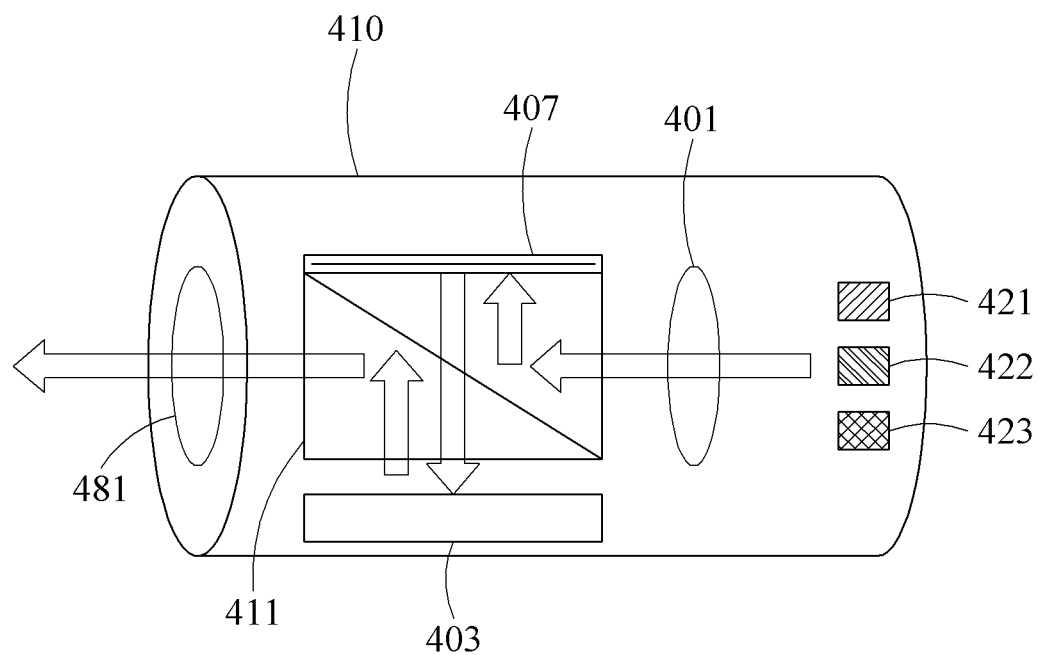
FIG. 4 is a diagram illustrating a structure of a non-self-luminous display included in a wearable electronic device according to an example embodiment.

FIG. 4 is a diagram illustrating a structure of a non-self-luminous display included in a wearable electronic device according to an example embodiment.

According to an example embodiment, the wearable electronic device (e.g., the wearable electronic device 300 of FIG. 3) may use a non-self-luminous display 410. The non-self-luminous display 410 may include a light modulator 403, and auxiliary light sources 421, 422, and 423. For example, the light modulator 403 may be implemented with LCD, DMD, or LCoS technologies.

The auxiliary light sources 421, 422, and 423 may provide light to the light modulator 403. For example, the auxiliary light sources 421, 422, and 423 may include R, G, and B light sources. However, this is merely an example, and the auxiliary light sources 421, 422, and 423 may emit white light or light of other colors. The auxiliary light sources 421, 422, and 423 of a left-eye optical engine may emit light of a first color to be applied to a 3D left-eye image through any one or any combination of R, G, and B light sources. For example, the auxiliary light sources 421, 422, and 423 of the left-eye optical engine may emit red light as the first color. The auxiliary light sources 421, 422, and 423 of a right-eye optical engine may emit light of a second color to be applied to a 3D right-eye image through any one or any combination of R, G, and B light sources. For example, the auxiliary light sources 421, 422, and 423 of the right-eye optical engine may emit blue light as the second color.

The non-self-luminous display 410 may further include optical elements such as a collimation lens 401, a polarization beam splitter (PBS) 411, a mirror 407, or a projection lens 481. The collimation lens 401 may perform the function of collecting outputs of the auxiliary light sources 421, 422, and 423 into a narrow area. The PBS 411 or the minor 407 may split light passing through the collimation lens 401 or adjust the path of the light to transmit the light to the light modulator 403. The projection lens 481 may project light emitted from the light modulator 403 to an input optical member (e.g., the input optical members 220a and 220b of FIG. 3).

The light modulator 403 may modulate the phase or the amplitude of light emitted from the auxiliary light sources 421, 422, and 423. The light modulator 403 may include an amplitude modulation spatial light modulator, a phase modulation spatial light modulator, or a complex spatial light modulator modulating both an amplitude and a phase. The light modulator 403 may include a transmission light modulator, a reflective light modulator, or a transflective light modulator.

The light modulator 403 is illustrated herein is a reflective light modulator, however, the example embodiments are not limited thereto. If the light modulator 403 is a transmission light modulator or a transflective light modulator, the position of the light modulator 403 and the relative arrangement relationship between the light modulator 403 and the other optical elements may change.

Figure 5:
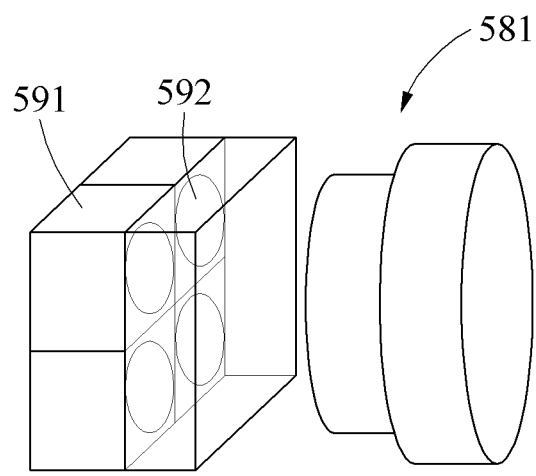
FIG. 5 is a diagram illustrating a structure of a self-luminous display included in a wearable electronic device according to an example embodiment.

FIG. 5 is a diagram illustrating a structure of a self-luminous display included in a wearable electronic device according to an example embodiment.

According to an example embodiment, the wearable electronic device (e.g., the wearable electronic device 300 of FIG. 3) may use a self-luminous display. The self-luminous display may include a plurality of visible light pixels 591 that output visible light corresponding to a virtual image. The visible light pixels 591 may include R, G, and B pixels.

A projection lens 581 may be disposed between a micro-LED 591 constituting the self-luminous display and an input optical member (e.g., the input optical members 220a and 220b of FIG. 3). A microlens 592 may be disposed between the micro-LED 591 and the projection lens 581. The microlens 592 may increase an efficiency and an intensity of light output from the micro-LED 591. Partitions (not shown) may be installed between the R, G, and B pixels. The partitions may prevent mixing and reflection of light emitted from each of the R, G, and B pixels and light of a neighboring pixel, to increase an efficiency and an intensity of light passing through the microlens 592.

A left-eye micro-LED 591 may emit light of the first color to be applied to the 3D left-eye image. For example, the left-eye micro-LED 591 may emit red light as the first color. A right-eye micro-LED 591 may emit light of a second color to be applied to the 3D right-eye image. For example, the right-eye micro-LED 591 may emit blue light as the second color.

Figure 6:
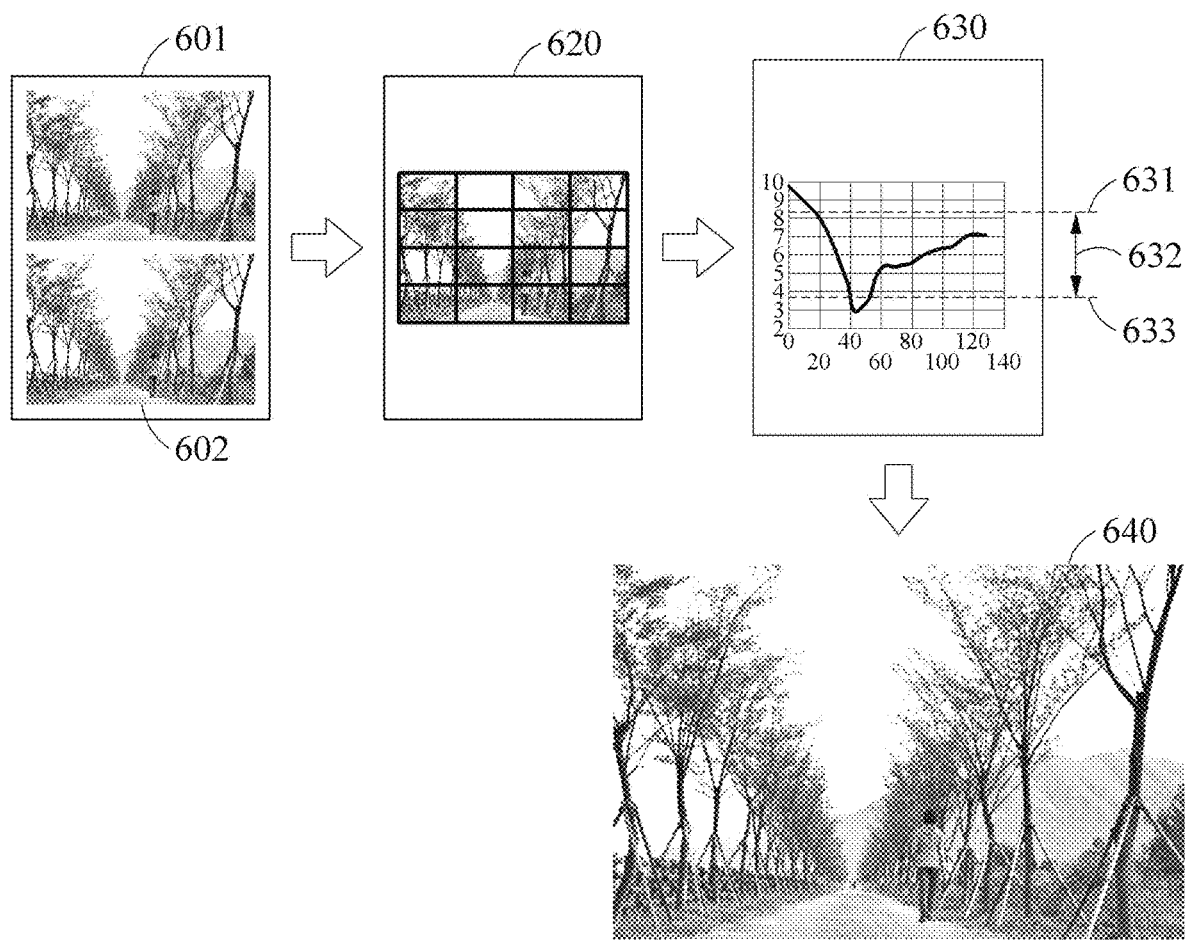
FIG. 6 is a diagram illustrating vertical alignment performed by a wearable electronic device or a mobile electronic device according to an example embodiment.

FIG. 6 is a diagram illustrating vertical alignment performed by a wearable electronic device or a mobile electronic device according to an example embodiment.

The mobile electronic device (e.g., the mobile electronic device 350 of FIG. 3) or the wearable electronic device (e.g., the wearable electronic device 300 of FIG. 3) may project a left-eye image 601 onto a right-eye image 602 or project the right-eye image 602 onto the left-eye image 601 to superimpose the left-eye image 601 and the right-eye image 602 to generate a composite image 620.

The mobile electronic device or the wearable electronic device may divide the composite image 620 into one or more window areas. For example, the mobile electronic device or the wearable electronic device may divide the composite image 620 of the left-eye image 601 and the right-eye image 602 into 16 windows.

The mobile electronic device or the wearable electronic device may calculate an SAD for the divided left-eye image and the divided right-eye image for each window area. The mobile electronic device or the wearable electronic device may calculate the sum of absolute values of differences in pixel values between the divided left-eye image and the divided right-eye image, and calculate a maximum value 631, a minimum value 633, and a difference value 632 between the maximum value 631 and the minimum value 633, as shown in a graph 630.

According to an example embodiment, the mobile electronic device or the wearable electronic device may vertically align the converted left-eye image and the converted right-eye image so that a sum of SADs for all windows may be minimized.

According to an example embodiment, the mobile electronic device or the wearable electronic device may calculate the sum of SADs by using different weights for each window. The mobile electronic device or the wearable electronic device may vertically align the converted left-eye image and the converted right-eye image such that the sum of the SADs after applying the weights may be minimized. For example, the mobile electronic device or the wearable electronic device may set the weight of a window located in the central portion of an image to be greater than the weight of a window located in the outer edge of the image.

An image 640 may represent the result obtained by performing superimposing after the left-eye image 601 and the right-eye image 602 are vertically aligned, and indicate a state in which mismatch in a vertical direction is greatly reduced in comparison to the composite image 620 of the left-eye image 601 and the right-eye image 602 that are not vertically aligned.

Figure 7:
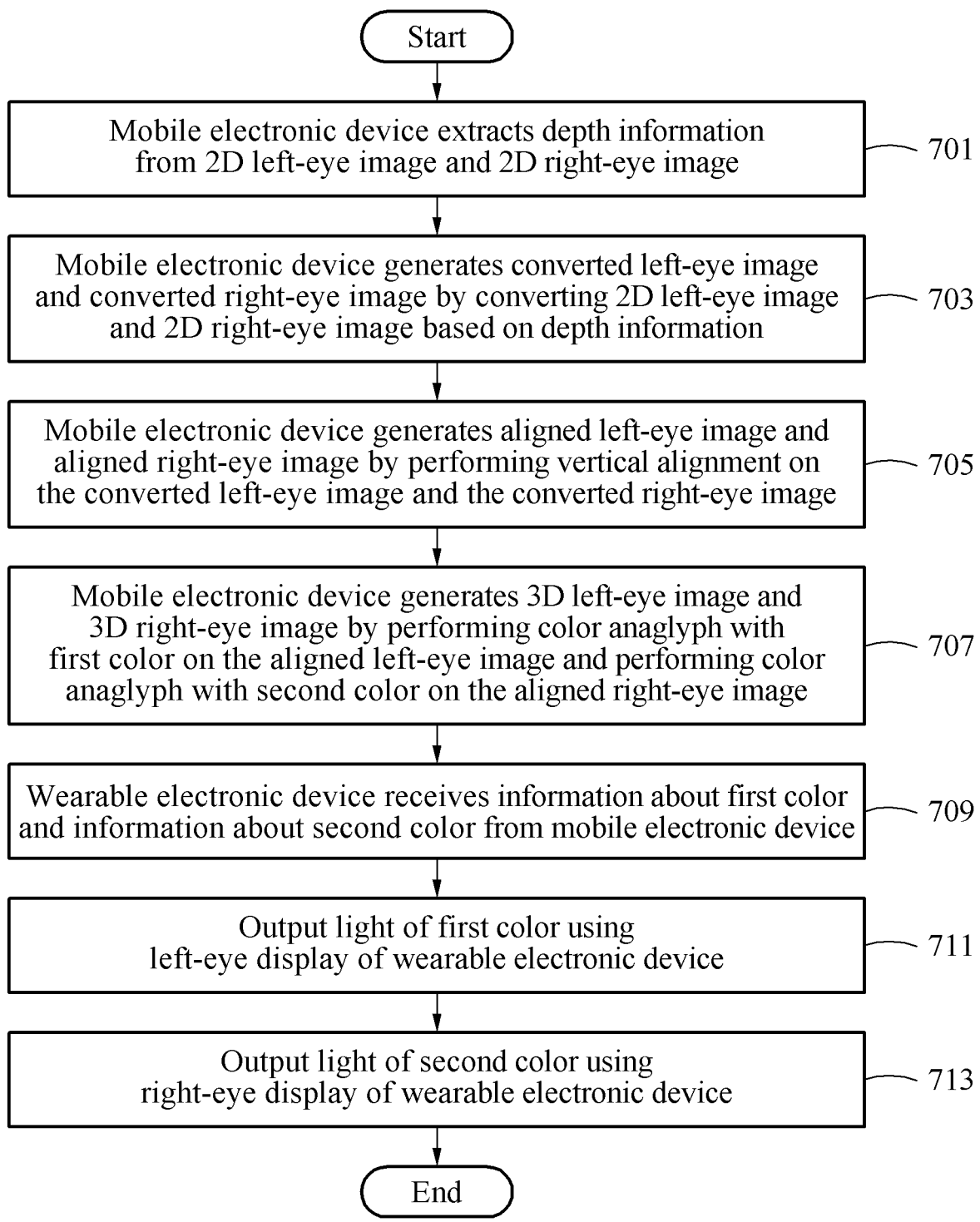
FIG. 7 is a flowchart illustrating an example of a method of outputting a 3D image.

FIG. 7 is a flowchart illustrating an example of a method of outputting a 3D image.

In the following examples, operations may be performed sequentially, but not necessarily performed sequentially. For example, the order of the operations may be changed and at least two of the operations may be performed in parallel.

According to an example embodiment, image processing for 3D conversion may be performed in an electronic device other than a wearable electronic device (e.g., the wearable electronic device 300 of FIG. 3). For example, the wearable electronic device and a mobile electronic device (e.g., the mobile electronic device 350 of FIG. 3) may be connected via a wire or wirelessly. The mobile electronic device may perform image processing for 3D conversion, and the wearable electronic device may receive the image on which 3D conversion is performed from the mobile electronic device and display the image.

According to an example embodiment, in operation 701, the mobile electronic device may extract depth information from a 2D left-eye image and a 2D right-eye image. For example, the mobile electronic device may perform a depth information extraction operation to convert the 2D left-eye image into a 3D left-eye image and convert the 2D right-eye image into a 3D right-eye image based on a 3D image transmission request from the wearable electronic device.

According to an example embodiment, in operation 703, the mobile electronic device may generate a converted left-eye image and a converted right-eye image by converting the 2D left-eye image and the 2D right-eye image based on the depth information.

According to an example embodiment, in operation 705, the mobile electronic device may generate an aligned left-eye image and an aligned right-eye image by performing vertical alignment on the converted left-eye image and the converted right-eye image. The mobile electronic device may superimpose the converted left-eye image and the converted right-eye image to generate a composite image. The mobile electronic device may divide the composite image into one or more window areas. The mobile electronic device may calculate an SAD in each of the one or more window areas. The mobile electronic device may align the converted left-eye image and the converted right-eye image such that the SAD for the one or more window areas is minimized, to generate the aligned left-eye image and the aligned right-eye image.

According to an example embodiment, in operation 707, the mobile electronic device may generate the 3D left-eye image and the 3D right-eye image by performing color anaglyph with a first color on the aligned left-eye image and performing color anaglyph with a second color on the aligned right-eye image.

According to an example embodiment, in operation 709, the wearable electronic device may receive information about the first color and information about the second color from the mobile electronic device. In an example, the wearable electronic device may use a wired communication scheme to receive the information about the first color and the information about the second color from the mobile electronic device. In another example, the wearable electronic device may use a wireless communication scheme to receive the information about the first color and the information about the second color from the mobile electronic device.

According to an example embodiment, in operation 711, the wearable electronic device may output light of the first color using a left-eye display of the wearable electronic device. If the left-eye display is a non-self-luminous display, the wearable electronic device may output the light of the first color using a left-eye auxiliary light source of the left-eye display. If the left-eye display is a self-luminous display, the wearable electronic device may output the light of the first color using a micro-LED of the left-eye display.

According to an example embodiment, in operation 713, the wearable electronic device may output light of the second color using a right-eye display of the wearable electronic device. If the right-eye display is a non-self-luminous display, the wearable electronic device may output the light of the second color using a right eye auxiliary light source of the right-eye display. If the right-eye display is a self-luminous display, the wearable electronic device may output the light of the second color using a micro-LED of the right-eye display.

Figure 8:
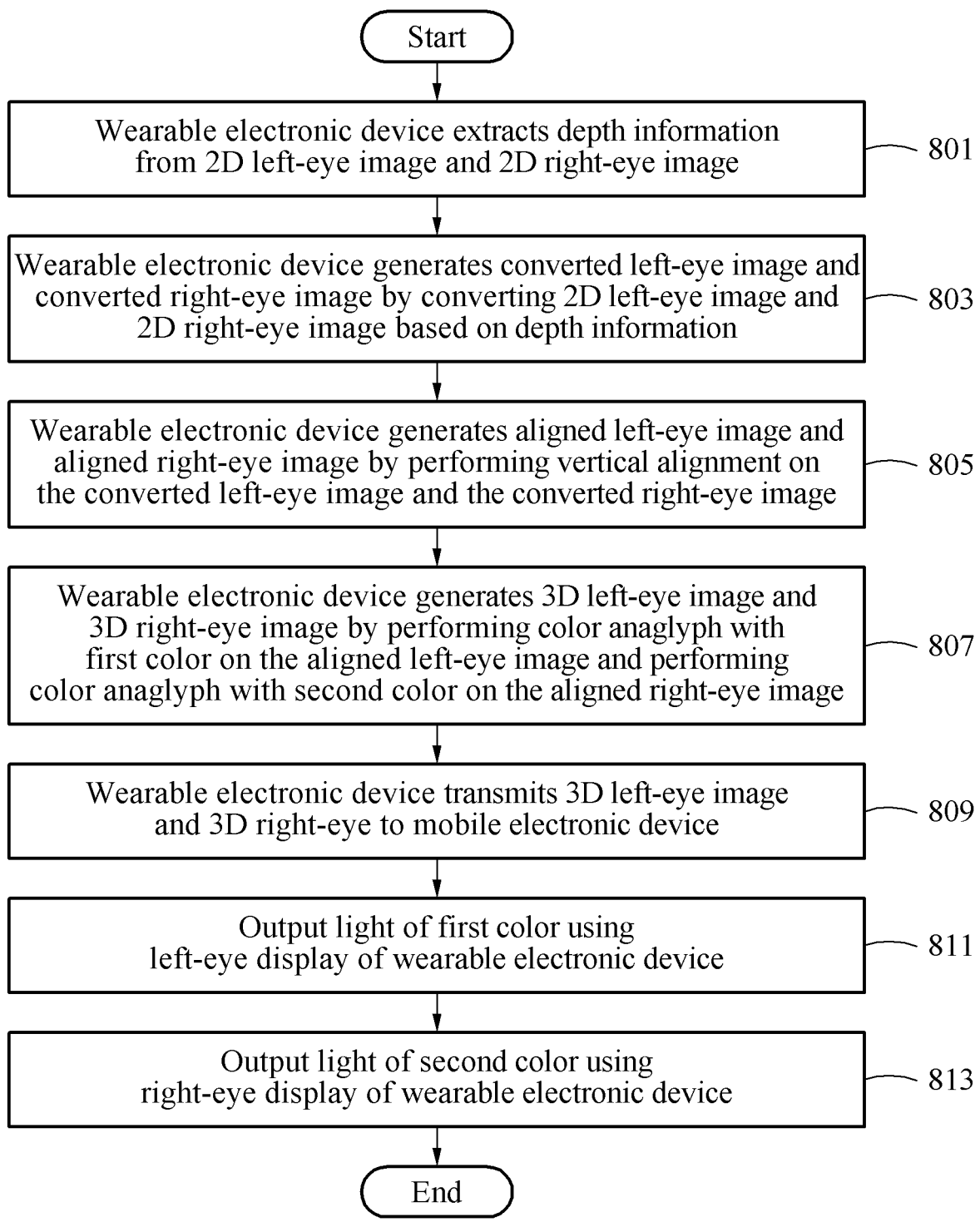
FIG. 8 is a flowchart illustrating another example of a method of outputting a 3D image.

FIG. 8 is a flowchart illustrating another example of a method of outputting a 3D image.

In the following examples, operations may be performed sequentially, but not necessarily performed sequentially. For example, the order of the operations may be changed and at least two of the operations may be performed in parallel.

According to an example embodiment, a wearable electronic device (e.g., the wearable electronic device 300 of FIG. 3) may provide a 3D effect to the user in a standalone manner.

According to an example embodiment, in operation 801, the wearable electronic device may extract depth information from a 2D left-eye image and a 2D right-eye image. For example, the wearable electronic device may perform a depth information extraction operation to convert the 2D left-eye image into a 3D left-eye image and convert the 2D right-eye image into a 3D right-eye image, based on a 3D image display request.

According to an example embodiment, in operation 803, the wearable electronic device may generate a converted left-eye image and a converted right-eye image by converting the 2D left-eye image and the 2D right-eye image based on the depth information.

According to an example embodiment, in operation 805, the wearable electronic device may generate an aligned left-eye image and an aligned right-eye image by performing vertical alignment on the converted left-eye image and the converted right-eye image. The wearable electronic device may superimpose the converted left-eye image and the converted right-eye image to generate a composite image. The wearable electronic device may divide the composite image into one or more window areas. The wearable electronic device may calculate an SAD in each of the one or more window areas. The wearable electronic device may align the converted left-eye image and the converted right-eye image such that the SAD for the one or more window areas is minimized, to generate the aligned left-eye image and the aligned right-eye image.

According to an example embodiment, in operation 807, the wearable electronic device may generate the 3D left-eye image and the 3D right-eye image by performing color anaglyph with a first color on the aligned left-eye image and performing color anaglyph with a second color on the aligned right-eye image.

According to an example embodiment, in operation 809, the wearable electronic device may transmit the 3D left-eye image and the 3D right-eye image to a mobile electronic device (e.g., the mobile electronic device 350 of FIG. 3).

According to an example embodiment, in operation 811, the wearable electronic device may output light of the first color using a left-eye display of the wearable electronic device. If the left-eye display is a non-self-luminous display, the wearable electronic device may output the light of the first color using a left-eye auxiliary light source of the left-eye display. If the left-eye display is a self-luminous display, the wearable electronic device may output the light of the first color using a micro-LED of the left-eye display.

According to an example embodiment, in operation 813, the wearable electronic device may output light of the second color using a right-eye display of the wearable electronic device. If the right-eye display is a non-self-luminous display, the wearable electronic device may output the light of the second color using a right eye auxiliary light source of the right-eye display. If the right-eye display is a self-luminous display, the wearable electronic device may output the light of the second color using a micro-LED of the right-eye display.

Figure 9:
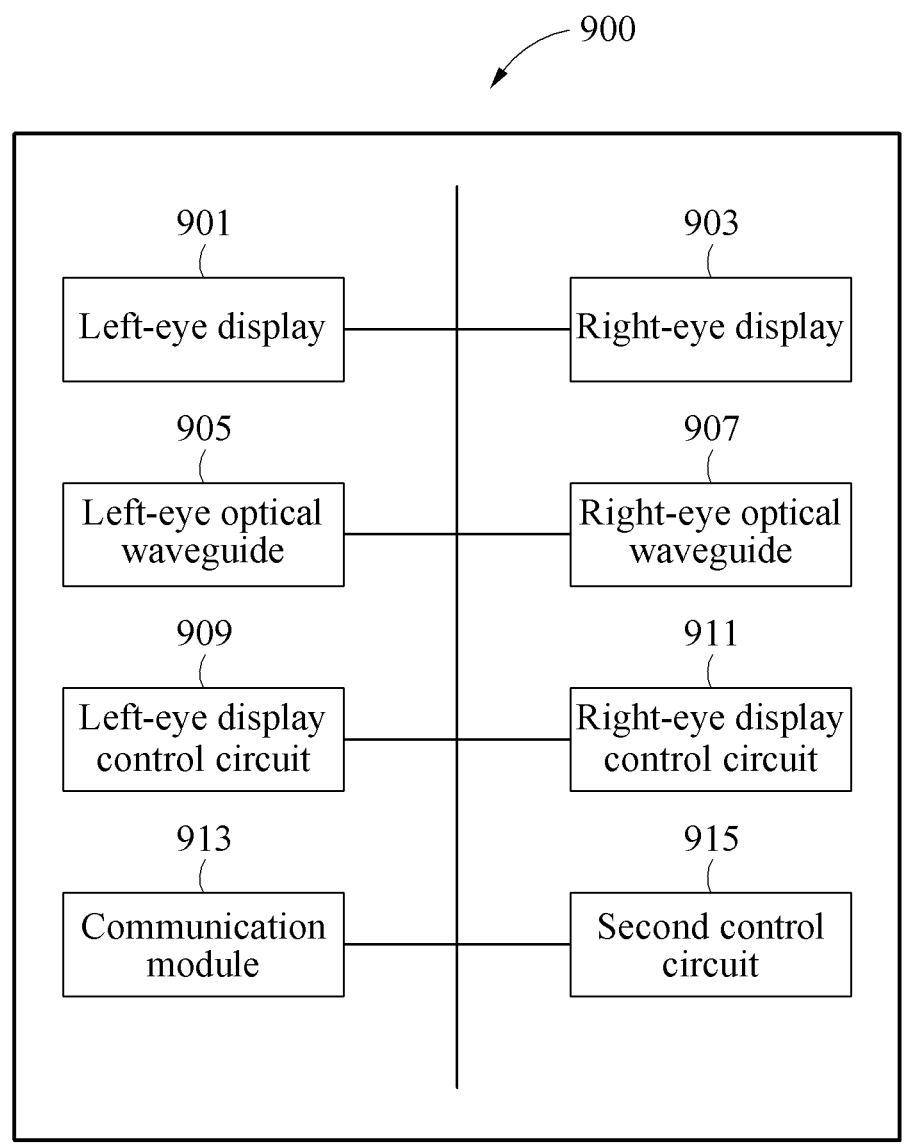
FIG. 9 is a diagram illustrating a configuration of a wearable electronic device according to an example embodiment.

FIG. 9 is a diagram illustrating a configuration of a wearable electronic device according to an example embodiment.

According to an example embodiment, a wearable electronic device 900 (e.g., the wearable electronic device 300 of FIG. 3) may include a left-eye display 901 (e.g., the second display 210 of FIG. 2), a right-eye display 903 (e.g., the first display 205 of FIG. 2), a left-eye optical waveguide 905 (e.g., the optical waveguide 215b of FIG. 2), a right-eye optical waveguide 907 (e.g., the optical waveguide 215a of FIG. 2)), a left-eye display control circuit 909 (e.g., a control circuit included in the second display 210 of FIG. 2), a right-eye display control circuit 911 (e.g., a control circuit included in the first display 205 of FIG. 2), a communication module 913 (e.g., the communication module 190 of FIG. 1), and a second control circuit 915 that may be located on, for example, the first PCB 235a and the second PCB 235b of FIG. 2.

The left-eye display 901 may output light of a first color corresponding to a 3D left-eye image. The right-eye display 903 may output light of a second color corresponding to a 3D right-eye image.

The left-eye optical waveguide 905 may output the light of the first color by adjusting the path of the light of the first color. The right-eye optical waveguide 907 may output the light of the second color by adjusting the path of the light of the second color.

The left-eye display control circuit 909 may supply driving power and control signals to the left-eye display. The right-eye display control circuit 915 may supply driving power and control signals to the right-eye display.

The communication module 913 may communicate with a mobile electronic device (e.g., the mobile electronic device 350 of FIG. 3). In an example, the communication module 913 may receive information about the first color and information about the second color from the mobile electronic device, using a wired communication scheme. In another example, the communication module 913 may receive the information about the first color and the information about the second color from the mobile electronic device, using a wireless communication scheme.

The second control circuit 915 may supply driving power and control signals to the communication module 913.

The mobile electronic device may extract depth information from a 2D left-eye image and a 2D right-eye image. The mobile electronic device may generate a converted left-eye image and a converted right-eye image by converting the 2D left-eye image and the 2D right-eye image based on the depth information. The mobile electronic device may generate an aligned left-eye image and an aligned right-eye image by performing vertical alignment on the converted left-eye image and the converted right-eye image. The mobile electronic device may generate a 3D left-eye image and a 3D right-eye image by performing color anaglyph with the first color on the aligned left-eye image and performing color anaglyph with the second color on the aligned right-eye image. The mobile electronic device may display the 3D left-eye image and the 3D right-eye image, using a display of the mobile electronic device.

The communication module 913 may receive the information about the first color and the information about the second color from the mobile electronic device.

The left-eye display 901 may output the light of the first color, and the right-eye display 903 may output the light of the second color. The left-eye display 901 may include a left-eye auxiliary light source, and the right-eye display 903 may include a right-eye auxiliary light source. The left-eye display 901 may output the light of the first color, using the left-eye auxiliary light source, and the right-eye display 903 may output the light of the second color, using the right-eye auxiliary light source.

Each of the left-eye display 901 and the right-eye display 903 may be a self-luminous display. The left-eye display 901 may output the light of the first color, using a micro-LED of the left-eye display 901, and the right-eye display 903 may output the light of the second color, using a micro-LED of the right-eye display 903.

The mobile electronic device may superimpose the converted left-eye image and the converted right-eye image to generate a composite image, and may divide the composite image into one or more window areas. The mobile electronic device may calculate an SAD in each of the one or more window areas. The mobile electronic device may align the converted left-eye image and the converted right-eye image such that the SAD for the one or more window areas is minimized, to generate the aligned left-eye image and the aligned right-eye image.

According to an example embodiment, the wearable electronic device 900 (e.g., the wearable electronic device 300 of FIG. 3) may include a left-eye display 901, a right-eye display 903, a left-eye optical waveguide 905, a right-eye optical waveguide 907, a left-eye display control circuit 909, a right-eye display control circuit 911, a communication module 913, and a second control circuit 915.

The left-eye display 901 may output light of a first color corresponding to a 3D left-eye image. The right-eye display 903 may output light of a second color corresponding to a 3D right-eye image.

The left-eye optical waveguide 905 may output the light of the first color by adjusting a path of the light of the first color. The right-eye optical waveguide 907 may output the light of the second color by adjusting a path of the light of the second color.

The left-eye display control circuit 909 may supply a driving power and a control signal to the left-eye display. The right-eye display control circuit 915 may supply a driving power and a control signal to the right-eye display.

The communication module 913 may communicate with a mobile electronic device (e.g., the mobile electronic device 350 of FIG. 3). In an example, the communication module 913 may receive information about the first color and information about the second color from the mobile electronic device, using a wired communication scheme. In another example, the communication module 913 may receive the information about the first color and the information about the second color from the mobile electronic device, using a wireless communication scheme.

The second control circuit 915 may supply a driving power and a control signal to the communication module 913.

The second control circuit 915 may extract depth information from a 2D left-eye image and a 2D right-eye image. The second control circuit 915 may generate a converted left-eye image and a converted right-eye image by converting the 2D left-eye image and the 2D right-eye image based on the depth information.

The second control circuit 915 may generate an aligned left-eye image and an aligned right-eye image by performing vertical alignment on the converted left-eye image and the converted right-eye image. The second control circuit 915 may superimpose the converted left-eye image and the converted right-eye image to generate a composite image. The second control circuit 915 may divide the composite image into one or more window areas. The second control circuit 915 may calculate an SAD in each of the one or more window areas. The second control circuit 915 may align the converted left-eye image and the converted right-eye image such that an SAD for the one or more window areas is minimized, to generate the aligned left-eye image and the aligned right-eye image.

The second control circuit 915 may generate a 3D left-eye image and a 3D right-eye image by performing color anaglyph with the first color on the aligned left-eye image and performing color anaglyph with the second color on the aligned right-eye image.

The communication module 913 may transmit the 3D left-eye image and the 3D right-eye image to the mobile electronic device. The mobile electronic device may display the received 3D left-eye image and the received 3D right-eye image.

The left-eye display 901 may output the light of the first color, and the right-eye display 903 may output the light of the second color. If the left-eye display 901 and the right-eye display 903 are non-self-luminous displays, the left-eye display 901 may include a left-eye auxiliary light source, and the right-eye display 903 may include a right-eye auxiliary light source. The left-eye display 901 may output the light of the first color, using the left-eye auxiliary light source. The right-eye display 903 may output the light of the second color, using the right-eye auxiliary light source.

Each of the left-eye display 901 and the right-eye display 903 may be a self-luminous display. The left-eye display 901 may output the light of the first color, using the left-eye auxiliary light source. The right-eye display 903 may output the light of the second color, using the right-eye auxiliary light source.

The electronic devices according to certain example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that certain example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Certain example embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to certain example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain example embodiments, each component (e.g., a module or a program) of the above-described components may include a single entity or multiple entities, and some of the multiple entities may be separately disposed in different components. According to certain example embodiments, one or more of the above-described components may be omitted, or one or more other components may be added. Alternatively or additionally, a plurality of components (e.g., modules or programs) may be integrated into a single component. In such a case, according to certain example embodiments, the integrated component may still perform one or more functions of each of the plurality of components in the same or similar manner as they are performed by a corresponding one of the plurality of to components before the integration. According to certain example embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A wearable electronic device comprising:
a left-eye display configured to output light of a first color corresponding to a three-dimensional (3D) left-eye image;
a right-eye display configured to output light of a second color corresponding to a 3D right-eye image;
a left-eye optical waveguide configured to adjust a path of the light of the first color and output the light of the first color;
a right-eye optical waveguide configured to adjust a path of the light of the second color and output the light of the second color;
a left-eye display control circuit configured to supply a driving power and a control signal to the left-eye display;
a right-eye display control circuit configured to supply a driving power and a control signal to the right-eye display;
a communication module configured to communicate with a mobile electronic device; and
a second control circuit configured to supply a driving power and a control signal to the communication module,
wherein the mobile electronic device is configured to extract depth information from a two-dimensional (2D) left-eye image and a 2D right-eye image, generate a converted left-eye image and a converted right-eye image by converting the 2D left-eye image and the 2D right-eye image based on the depth information, generate an aligned left-eye image and an aligned right-eye image by performing vertical alignment on the converted left-eye image and the converted right-eye image, generate a 3D left-eye image and a 3D right-eye image by performing color anaglyph with the first color on the aligned left-eye image and performing color anaglyph with the second color on the aligned right-eye image, and display the 3D left-eye image and the 3D right-eye image using a display of the mobile electronic device, and
wherein the communication module is configured to receive information about the first color and information about the second color from the mobile electronic device.

2. The wearable electronic device of claim 1, wherein:
the left-eye display further comprises a left-eye auxiliary light source,
the right-eye display further comprises a right-eye auxiliary light source,
the left-eye display is configured to output the light of the first color using the left-eye auxiliary light source, and
the right-eye display is configured to output the light of the second color using the right-eye auxiliary light source.

3. The wearable electronic device of claim 1, wherein:
the left-eye display and the right-eye display are each a self-luminous display, and
the left-eye display is configured to output the light of the first color using a micro light-emitting diode (LED) of the left-eye display, and
the right-eye display is configured to output the light of the second color using a micro-LED of the right-eye display.

4. The wearable electronic device of claim 1, wherein the communication module is configured to receive the information about the first color and the information about the second color from the mobile electronic device, using a wired communication scheme.

5. The wearable electronic device of claim 1, wherein the communication module is configured to receive the information about the first color and the information about the second color from the mobile electronic device, using a wireless communication scheme.

6. The wearable electronic device of claim 1, wherein the mobile electronic device is configured to:
superimpose the converted left-eye image and the converted right-eye image to generate a composite image;
divide the composite image into one or more window areas;
calculate a sum of absolute differences (SAD) in each of the one or more window areas; and
align the converted left-eye image and the converted right-eye image such that an SAD for at least one of the one or more window areas is minimized to generate the aligned left-eye image and the aligned right-eye image.

7. A wearable electronic device comprising:
a left-eye display configured to output light of a first color corresponding to a three-dimensional (3D) left-eye image;
a right-eye display configured to output light of a second color corresponding to a 3D right-eye image;
a left-eye optical waveguide configured to adjust a path of the light of the first color and output the light of the first color;
a right-eye optical waveguide configured to adjust a path of the light of the second color and output the light of the second color;
a left-eye display control circuit configured to supply a driving power and a control signal to the left-eye display;
a right-eye display control circuit configured to supply a driving power and a control signal to the right-eye display;
a communication module configured to communicate with a mobile electronic device; and
a second control circuit configured to supply a driving power and a control signal to the communication module,
wherein the second control circuit is configured to extract depth information from a two-dimensional (2D) left-eye image and a 2D right-eye image, generate a converted left-eye image and a converted right-eye image by converting the 2D left-eye image and the 2D right-eye image based on the depth information, generate an aligned left-eye image and an aligned right-eye image by performing vertical alignment on the converted left-eye image and the converted right-eye image, and generate a 3D left-eye image and a 3D right-eye image by performing color anaglyph with the first color on the aligned left-eye image and performing color anaglyph with the second color on the aligned right-eye image, and
wherein the communication module is configured to transmit the 3D left-eye image and the 3D right-eye image to the mobile electronic device.

8. The wearable electronic device of claim 7, wherein:
the left-eye display further comprises a left-eye auxiliary light source,
the right-eye display further comprises a right-eye auxiliary light source,
the left-eye display is configured to output the light of the first color using the left-eye auxiliary light source, and the right-eye display is configured to output the light of the second color using the right-eye auxiliary light source.

9. The wearable electronic device of claim 7, wherein:
the left-eye display and the right-eye display are each a self-luminous display, and
the left-eye display is configured to output the light of the first color using a left-eye auxiliary light source of the left-eye display, and
the right-eye display is configured to output the light of the second color using a right-eye auxiliary light source of the right-eye display.

10. The wearable electronic device of claim 7, wherein the second control circuit is configured to:
superimpose the converted left-eye image and the converted right-eye image to generate a composite image;
divide the composite image into one or more window areas;
calculate a sum of absolute differences (SAD) in each of the one or more window areas; and
align the converted left-eye image and the converted right-eye image such that an SAD for at least one of the one or more window areas is minimized to generate the aligned left-eye image and the aligned right-eye image.

11. A method of outputting a three-dimensional (3D) image, the method comprising:
extracting, by a mobile electronic device, depth information from a two-dimensional (2D) left-eye image and a 2D right-eye image;
generating, by the mobile electronic device, a converted left-eye image and a converted right-eye image by converting the 2D left-eye image and the 2D right-eye image based on the depth information;
generating, by the mobile electronic device, an aligned left-eye image and an aligned right-eye image by performing vertical alignment on the converted left-eye image and the converted right-eye image;
generating, by the mobile electronic device, a 3D left-eye image and a 3D right-eye image by performing color anaglyph with a first color on the aligned left-eye image and performing color anaglyph with a second color on the aligned right-eye image;
receiving, by a wearable electronic device, information about the first color and information about the second color from the mobile electronic device;
outputting light of the first color using a left-eye display of the wearable electronic device; and
outputting light of the second color using a right-eye display of the wearable electronic device.

12. The method of claim 11, wherein:
the outputting of the light of the first color further comprises outputting the light of the first color using a left-eye auxiliary light source of the left-eye display, and
the outputting of the light of the second color further comprises outputting the light of the second color using a right-eye auxiliary light source of the right-eye display.

13. The method of claim 11, wherein:
The outputting of the light of the first color further comprises outputting the light of the first color using a micro light-emitting diode (LED) of the left-eye display, and
the outputting of the light of the second color further comprises outputting the light of the second color using a micro-LED of the right-eye display.

14. The method of claim 11, wherein the receiving of the information about the first color and the information about the second color further comprises receiving the information about the first color and the information about the second color from the mobile electronic device, using a wired communication scheme.

15. The method of claim 11, wherein the receiving of the information about the first color and the information about the second color further comprises receiving the information about the first color and the information about the second color from the mobile electronic device, using a wireless communication scheme.

16. The method of claim 11, wherein the generating of the aligned left-eye image and the aligned right-eye image further comprises:
superimposing, by the mobile electronic device, the converted left-eye image and the converted right-eye image to generate a composite image;
dividing, by the mobile electronic device, the composite image into one or more window areas;
calculating, by the mobile electronic device, a sum of absolute differences (SAD) in each of the one or more window areas; and
aligning, by the mobile electronic device, the converted left-eye image and the converted right-eye image such that an SAD for at least one of the one or more window areas is minimized to generate the aligned left-eye image and the aligned right-eye image.

17. A method of outputting a three-dimensional (3D) image, the method comprising:
extracting, by a wearable electronic device, depth information from a two-dimensional (2D) left-eye image and a 2D right-eye image;
generating, by the wearable electronic device, a converted left-eye image and a converted right-eye image by converting the 2D left-eye image and the 2D right-eye image based on the depth information;
generating, by the wearable electronic device, an aligned left-eye image and an aligned right-eye image by performing vertical alignment on the converted left-eye image and the converted right-eye image;
generating, by the wearable electronic device, a 3D left-eye image and a 3D right-eye image by performing color anaglyph with a first color on the aligned left-eye image and performing color anaglyph with a second color on the aligned right-eye image;
transmitting, by the wearable electronic device, the 3D left-eye image and the 3D right-eye image to a mobile electronic device;
outputting light of the first color using a left-eye display of the wearable electronic device; and
outputting light of the second color using a right-eye display of the wearable electronic device.

18. The method of claim 17, wherein:
the outputting of the light of the first color further comprises outputting the light of the first color using a left-eye auxiliary light source of the left-eye display, and
the outputting of the light of the second color further comprises outputting the light of the second color using a right-eye auxiliary light source of the right-eye display.

19. The method of claim 17, wherein:
the outputting of the light of the first color further comprises outputting the light of the first color using a micro light-emitting diode (LED) of the left-eye display, and the outputting of the light of the second color further comprises outputting the light of the second color using a micro-LED of the right-eye display.

20. The method of claim 17, wherein the generating of the aligned left-eye image and the aligned right-eye image comprises:
   superimposing, by the wearable electronic device, the converted left-eye image and the converted right-eye image to generate a composite image;
   dividing, by the wearable electronic device, the composite image into one or more window areas;
   calculating, by the wearable electronic device, a sum of absolute differences (SAD) in each of the one or more window areas; and
   aligning, by the wearable electronic device, the converted left-eye image and the converted right-eye image such that an SAD for at least one of the one or more window areas is minimized to generate the aligned left-eye image and the aligned right-eye image.

* * * * *